E. W. BAXTER.
ATTACHMENT FOR MOTOR VEHICLES.
APPLICATION FILED APR. 25, 1921.

1,421,147.
Patented June 27, 1922.

E. W. Baxter INVENTOR

BY Victor J. Evans ATTORNEY

UNITED STATES PATENT OFFICE.

ERNEST W. BAXTER, OF VAN WERT, OHIO.

ATTACHMENT FOR MOTOR VEHICLES.

1,421,147. Specification of Letters Patent. Patented June 27, 1922.

Application filed April 25, 1921. Serial No. 464,326.

*To all whom it may concern:*

Be it known that I, ERNEST W. BAXTER, a citizen of the United States, residing at Van Wert, in the county of Van Wert and State of Ohio, have invented new and useful Improvements in Attachments for Motor Vehicles, of which the following is a specification.

This invention relates to an attachment for motor vehicles, the principal object of the invention being to provide throttle operating means located on the clutch pedal or the brake pedal and so arranged that the throttle will be closed when the pedal is depressed to release the clutch or to apply the brakes.

Another object of the invention is to so arrange the parts that the throttle may be held in open position by the foot resting upon the pedal without operating the pedal.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1:
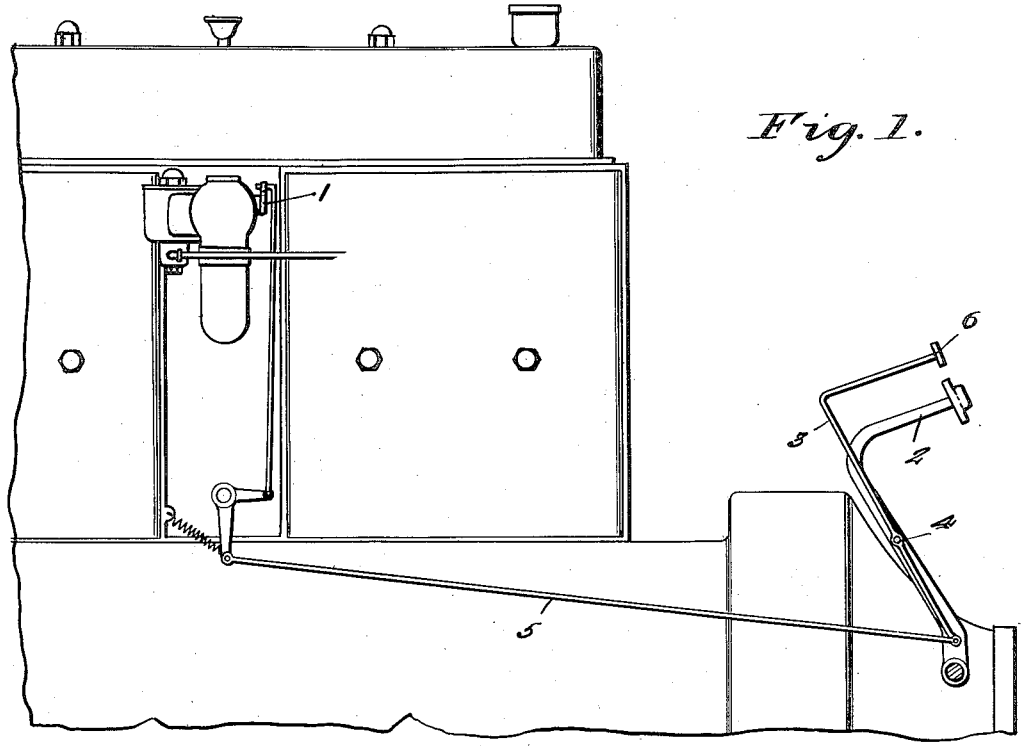
Figure 1 is a diagrammatic view of the invention.
Figure 2:
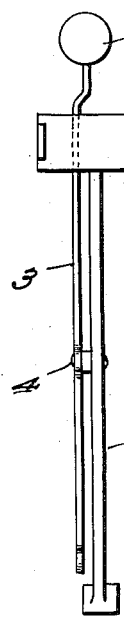
Figure 2 is a detail view.

In these views 1 indicates the throttle arm of the motor of the vehicle and 2 indicates either the clutch pedal or the brake pedal of the vehicle as my invention may be applied to either the brake or clutch pedal. In carrying out my invention I pivot a lever 3, intermediate its ends, to the pedal 2 by means of the pivot pin 4 and I connect the lower end of this lever with the throttle or by means of the link 5. The upper end of the lever has secured thereto an accelerator pedal 6 which extends above the foot part of pedal 2 so that it can be depressed by the foot when the same is resting on the said pedal 2 and without actuating the said pedal 2. The pivotal connection between the lever 4 and link 5 is located above the pivotal point of the pedal 2 so that when said pedal 2 is pushed forwardly to release the clutch or apply the brake the entire attachment will be carried forwardly with the pedal so that the throttle will be closed. By rocking the foot on the foot part of pedal 2 the accelerator 6 can be depressed to move lever 3 to control the throttle through link 5.

It will thus be seen that by my invention the motor is automatically slowed up by applying the brake or releasing the clutch so that both feet can be kept adjacent the clutch and the brake pedal at all times.

It will also be seen that the accelerator can be operated with the pedal in depressed position so that the motor can be accelerated with the clutch out. This is desirable in shifting gears. If the device is placed on the brake pedal the motor can be accelerated with the brakes applied.

It will of course be understood that the usual hand lever may be used to operate the throttle independently of the foot control.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

In combination with the foot pedal and throttle of a motor vehicle, a lever pivoted to the pedal, a link connecting the lower end of the lever with the throttle and a foot piece on the upper end of the lever projecting above the foot piece of the pedal.

In testimony whereof I affix my signature.

ERNEST W. BAXTER.